April 12, 1932. S. L. KELLY 1,853,361
PROPULSION AND STEERING MEANS FOR AIRCRAFT
Filed Feb. 12, 1930 3 Sheets-Sheet 1
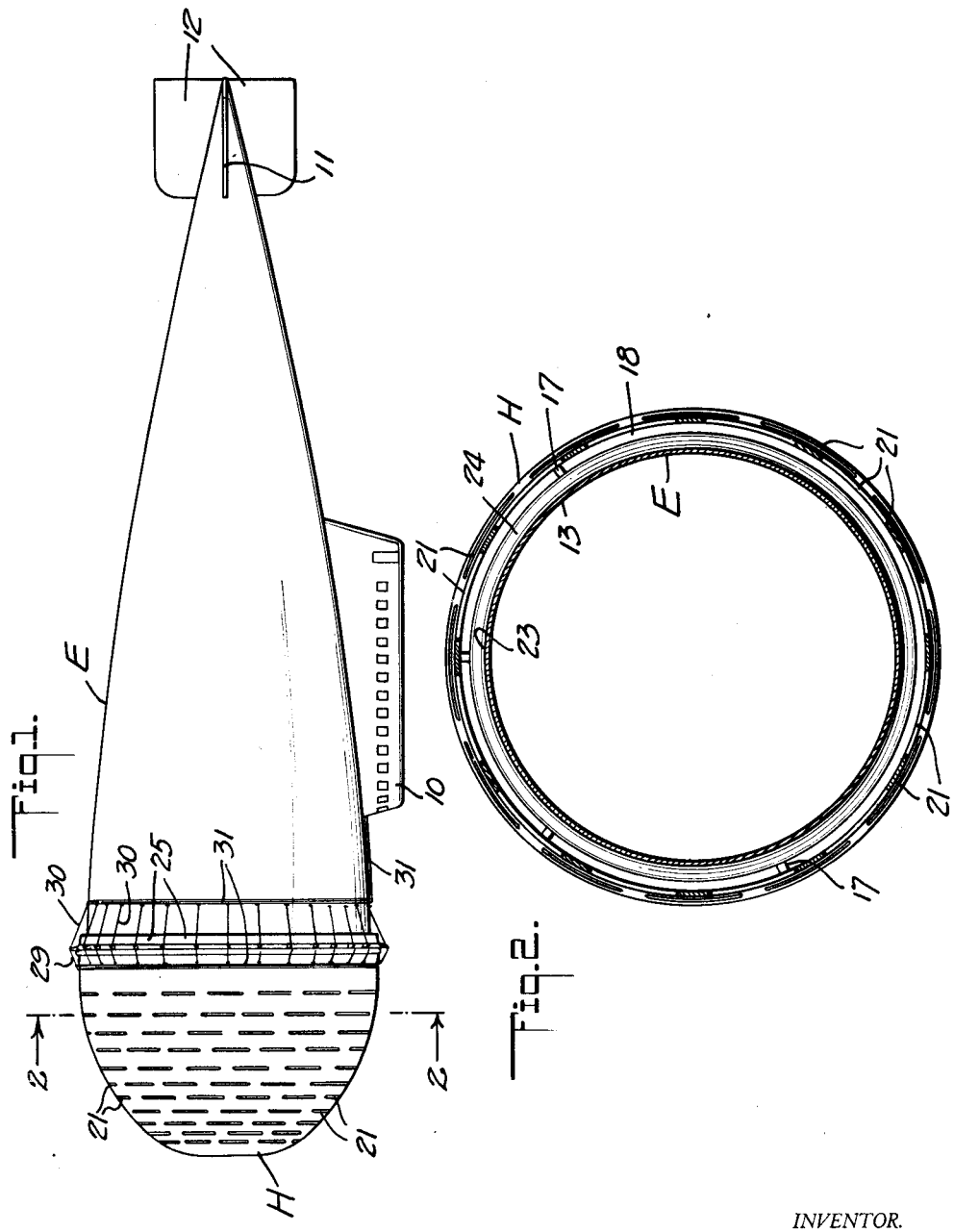
INVENTOR.
STANLEY L. KELLY
BY
ATTORNEYS.

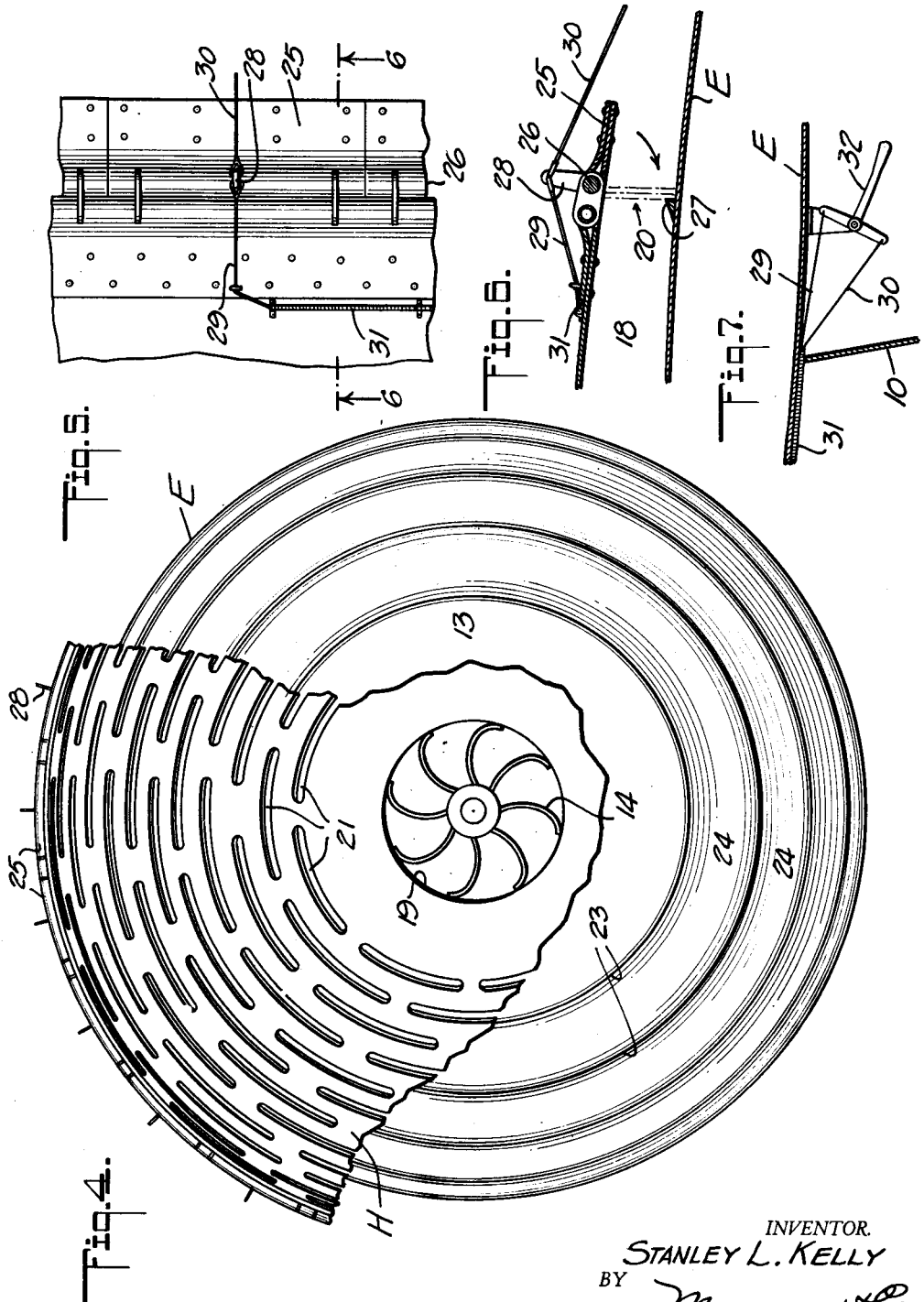

Patented Apr. 12, 1932

1,853,361

UNITED STATES PATENT OFFICE

STANLY L. KELLY, OF LOS ANGELES, CALIFORNIA

PROPULSION AND STEERING MEANS FOR AIRCRAFT

Application filed February 12, 1930. Serial No. 427,852.

My invention relates to and has for a purpose the provision of means by which differential air pressures can be created in the atmosphere surrounding the body of an aircraft, such as the envelope of a dirigible for example, in a manner to cause propulsion of the aircraft through the air.

More specifically, it is a purpose of my invention to provide means for withdrawing air from an area in advance of the nose portion of an aircraft body such as the envelope of a dirigible, and thus decreasing the pressure of the air in advance of the body, so that as a result of relatively increased air pressure rearwardly of the nose portion of the body, acting upon the latter, the aircraft will be propelled forwardly.

It is a further purpose of my invention to provide propulsion means of the above described character, in which steering means is embodied and is controlled in such manner that unequal air pressures can be created in the atmosphere in advance of the nose portion of the aircraft body on opposed sides of the longitudinal axis of the latter, so as to cause lateral movement or shifting of the nose portion in a predetermined direction, and hence effect steering of the aircraft.

I will describe only one form of propulsion and steering means for aircraft embodying my invention and will then point out the novel features thereof in claims.

In the accompanying drawings,

Figure 1 is a view showing in side elevation, one form of propulsion and steering means embodying my invention, applied to the envelope of a dirigible.

Figure 2 is an enlarged transverse sectional view taken on the line 2—2 of Figure 1 and looking in the direction of the arrows.

Figure 4 is a view in front end elevation partly broken away, of the envelope shown in Figure 3.

Figure 5 is a fragmentary plan view of the means by which steering movements of the dirigible are effected.

Figure 6 is a fragmentary sectional view taken on the line 6—6 of Figure 5 and looking in the direction of the arrows; and Figure 7 is a fragmentary detail sectional view illustrating one of a number of control members embodied in my invention.

Figure 3:
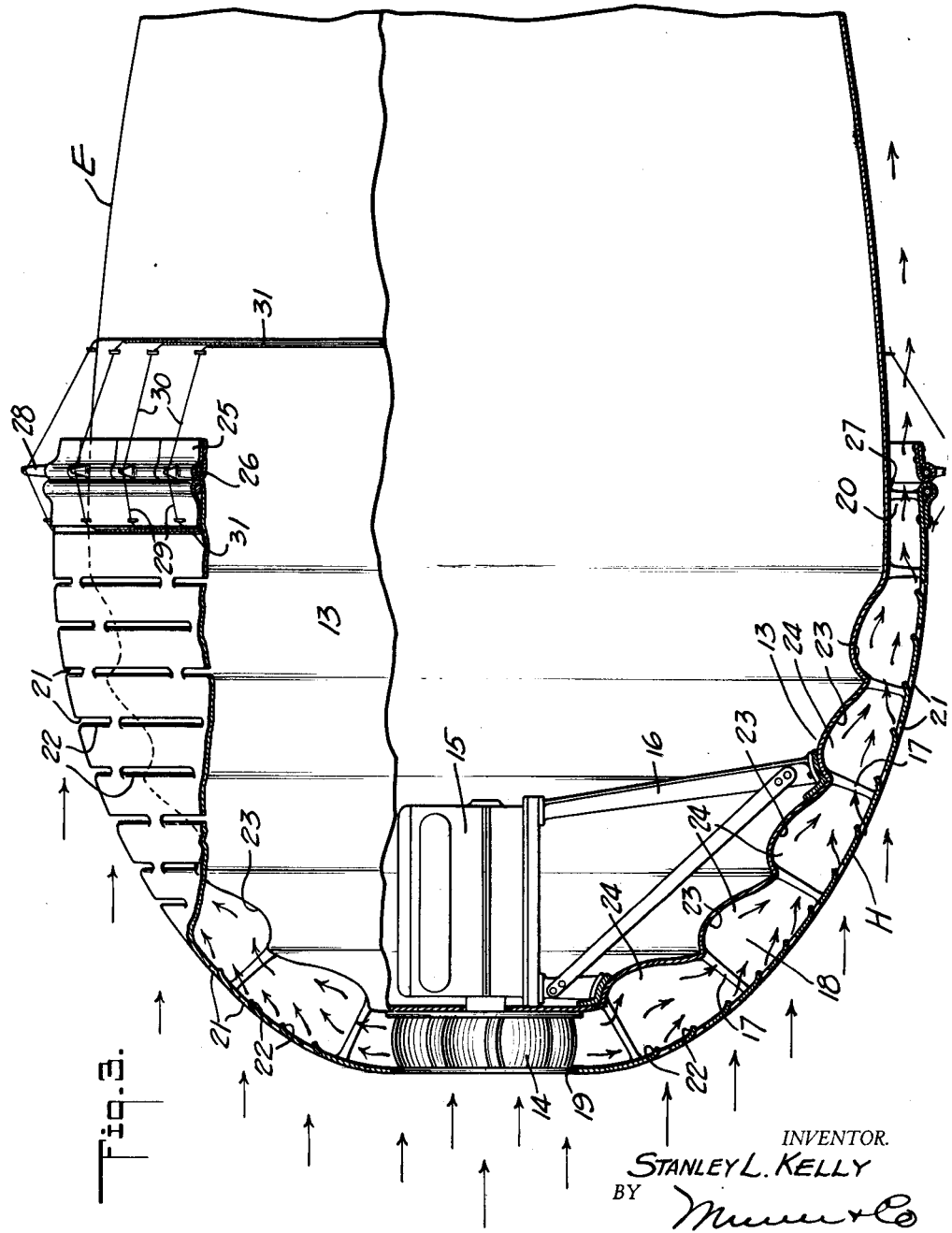
Figure 3 is an enlarged fragmentary view partly in side elevation and partly in longitudinal section, showing the nose portion of the envelope of the dirigible illustrated in Figure 1.

Referring specifically to the drawings in which similar reference characters designate similar parts in each of the several views, my invention in its present embodiment is shown for the purpose of illustration associated with an aircraft of the lighter than air type commonly known as the dirigible airship and embodying a rigid and streamlined envelope E of elongated form, containing suitable lifting gas such as hydrogen or helium. Depending from the envelope is a cabin 10 from which the pilot controls the aircraft, and in which passengers and freight can be carried. At the stern of the envelope, horizontal and vertical stabilizing surfaces 11 and 12 respectively, are provided.

My invention in its present embodiment provides a means for withdrawing atmospheric air from an area in advance of the nose portion 13 of the envelope, and in the present instance this means comprises a rotary suction fan 14 disposed immediately in advance of the nose portion and axially of the envelope as shown in Figures 3 and 4. The fan is directly connected to and positively driven by a suitable power plant 15 rigidly supported within the envelope by any suitable mounting 16.

To direct and conduct rearwardly of the envelope, the air withdrawn by the fan from the area axially in advance of the envelope, I provide a hood H preferably formed of metal and shaped to enclose the nose portion 13 of the envelope. The hood is supported by struts 17 in spaced relation to the nose portion so as to co-operate with the latter in defining an air passage 18. The hood is provided axially thereof with an inlet 19 of a diameter slightly larger than that of the fan 14 so that when the latter is in operation the air in advance threeof will be drawn through the inlet into the passage 18 and will be forced at a high velocity through the latter rearwardly of the envelope so as to discharge from an outlet 20 formed at the rear end of the hood between the latter and envelope and extending circumferentially around the latter.

The hood is provided with series of openings 21 in the form of circumferentially extending slots, and the material of which the hood is formed is inturned at the openings 21 as shown at 22 in Figure 3 to provide deflecting surfaces in the passage 18 which function to deflect air traversing the passage, away from the openings 21 and thus induce suction at the latter, which is operative to withdraw air from an area in advance of the hood surrounding the inlet 19, through the openings into the passage 18.

The exterior surface of the nose portion 13 is constructed to provide a series of undulations 23 one in advance of the other longitudinally of the envelope and extending circumferentially of the latter as clearly shown in Figures 3 and 4. By thus cambering the nose portion inwardly of the envelope, the air traversing the passage 18 will be deflected at intervals from the nose portion and will thus produce a partial vacuum in the annular cavities or pockets 24 formed by the undulations 23 so as to aid in the forward propulsion of the aircraft.

For the purpose of steering the aircraft, the outlet 20 of the air passage 18 is controlled by a series of independently operable shutters 25, each of which is hingedly mounted at 26 on the rear edge of the hood H so as to be movable to occupy either the open position shown in full lines in Figure 6 to permit the free and unrestricted discharge of air from the passage 18, or the broken line position shown in this figure, so as to close the respective portion of the outlet circumferentially and thus obstruct the discharge of air from the respective portion of the passage.

The closed position of each shutter is definitely limited by a stop member 27 secured to the envelope, and each shutter is rendered capable of manual actuation to its open and closed position, by the provision of an arm 28 secured to the shutter, and to which is connected, cables 29 and 30 leading in opposed directions from the arm and entering flexible conduits 31 affixed to the envelope to extend circumferentially thereof to any suitable form of control member 32 (Figure 7) in the pilot's compartment of the cabin 10.

The operation of the aircraft is as follows:

With the fan 14 in operation and assuming that the aircraft is in flight and that all the shutters 25 occupy open position, air from the area in advance of the fan will be drawn through the inlet 19 into the passage 18 and will discharge from the outlet 20 at a high velocity, thus decreasing the pressure of the air in advance of the nose portion 13 so that the preponderance of air pressure rearwardly of the latter will act upon the envelope E and effect forward propulsion of the aircraft.

Air from the area in advance of the nose portion surrounding the inlet 19 will also be drawn into the passage 18 through the openings 21 in the hood H, under the action of the air traversing the passage from the inlet 19 so as to decrease the pressure of the air in advance of the nose portion around the inlet, and thus aid in the forward propulsion of the aircraft as a result of the preponderance of air pressure acting upon the envelope rearwardly of the nose portion.

The air traversing the passage 18 will also act upon the exterior surface of the nose portion, to produce a partial vacuum in the annular cavities 24 and thus further decrease the pressure of air in advance of the nose portion so as to aid in the forward propulsion of the aircraft.

To effect steering of the aircraft in a predetermined direction, it is only necessary for the pilot to move to closed position, one or more of the shutters 25 located on the particular portion of the envelope's circumference towards which movement of the nose portion laterally or in a radial direction is to be effected, thus obstructing the discharge of air from the passage 18 through the respective portion of the outlet 20, and thereby rendering the air traversing the passage, ineffective to decrease the pressure of air in a substantially segmental shaped area in advance of the hood radially outward from the inlet 19, to the extent that the air pressure is decreased in the remaining area in advance of the nose portion. Unequal or differential air pressures will thus be created in advance of the nose portion 13, on opposite sides of the longitudinal axis of the envelope so that movement of the nose portion laterally towards the side of the envelope at which the closed shutter or shutters are located, will be effected, and steering movement of the aircraft from the nose of the envelope thus obtained.

Although I have herein shown and described only one form of propulsion and steering means for aircraft embodying my invention, it is to be understood that various changes and modifications may be made therein without departing from the spirit of the invention and the spirit and scope of the appended claims.

I claim as my invention:

1. In combination with the envelope of a dirigible, means defining an air passage in surrounding relation to the nose portion of the envelope, having a forwardly opening inlet in advance of the nose portion and an outlet circumferentially of the envelope, means for drawing air in advance of the envelope through the inlet and into said passage so as to decrease the pressure of air in advance of the envelope sufficiently for the air pressure rearwardly of the nose portion to act upon the envelope and propel the dirigible forwardly, and means responsive to the movement of air through said passage to draw additional air in advance of the envelope into the passage so as to aid in decreasing the air pressure in advance of the envelope and hence aid in the propulsion of the dirigible.

2. In combination with the envelope of a dirigible, a hood enclosing the nose portion of the envelope and spaced from the latter to provide an air passage, the hood having an inlet disposed axially of the envelope and coacting with the latter to define an outlet extending circumferentially of the envelope, and means for drawing air in advance of the envelope through the inlet and into said passage so as to decrease the pressure of air in advance of the envelope sufficiently for the air pressure rearwardly of the nose portion to act upon the envelope and propel the latter forwardly, the hood having openings through which air in advance of the envelope is drawn into said passage in response to movement of air from the inlet through the passage, and thereby aid in decreasing the air pressure in advance of the envelope and hence aid in the propulsion of the dirigible.

3. In combination with the envelope of a dirigible, means defining an air passage in surrounding relation to the nose portion of the envelope, having a forwardly opening inlet in advance of the nose portion and an outlet circumferentially of the envelope, means for drawing air in advance of the envelope through the inlet and into said passage so as to decrease the pressure of air in advance of the envelope sufficiently for the air pressure rearwardly of the nose portion to act upon the envelope and propel the dirigible forwardly, and means responsive to the movement of air in said passage, to create a partial vacuum on the exterior surface of the nose portion of the envelope so as to aid in the forward propulsion of the dirigible.

4. In combination with the envelope of a dirigible, means defining an air passage in surrounding relation to the nose portion of the envelope, having a forwardly opening inlet in advance of the nose portion and an outlet circumferentially of the envelope, means for drawing air in advance of the envelope through the inlet and into said passage so as to decrease the pressure of air in advance of the envelope sufficiently for the air pressure rearwardly of the nose portion to act upon the envelope and propel the dirigible forwardly, and means responsive to the movement of air in said passage, to create a partial vacuum on the exterior surface of the nose portion of the envelope so as to aid in the forward propulsion of the dirigible, the last means comprising depressions, one in advance of the other in the exterior surface of the nose portion.

5. In combination with the envelope of a dirigible, means defining an air passage in surrounding relation to the nose portion of the envelope, having a forwardly opening inlet in advance of the nose portion and an outlet circumferentially of the envelope, means for drawing air in advance of the envelope through the inlet and into said passage so as to decrease the pressure of air in advance of the envelope sufficiently for the air pressure rearwardly of the nose portion to act upon the envelope and propel the dirigible forwardly, and means responsive to the movement of air in said passage, to create a partial vacuum on the exterior surface of the nose portion of the envelope so as to aid in the forward propulsion of the dirigible, the last means comprising depressions in the exterior surface of the nose portion, extending circumferentially of the envelope.

6. In combination with the envelope of a dirigible, means defining an air passage in surrounding relation to the nose portion of the envelope, having a forwardly opening inlet in advance of the nose portion and an outlet circumferentially of the envelope, means for drawing air in advance of the envelope through the inlet and into said passage so as to decrease the pressure of air in advance of the envelope sufficiently for the air pressure rearwardly of the nose portion to act upon the envelope and propel the dirigible forwardly, and means responsive to the movement of air in said passage, to create a partial vacuum on the exterior surface of the nose portion of the envelope so as to aid in the forward propulsion of the dirigible, the last means comprising inwardly cambered surfaces on the exterior of the nose portion.

7. In combination with the envelope of a dirigible, means defining an air passage in surrounding relation to the nose portion of the envelope, having a forwardly opening inlet in advance of the nose portion and an outlet circumferentially of the envelope, means for drawing air in advance of the envelope through the inlet and into said passage so as to decrease the pressure of air in advance of the envelope sufficiently for the air pressure rearwardly of the nose portion to act upon the envelope and propel the dirigible forwardly, and means for rendering the last means ineffective to reduce the air pressure in advance of the envelope in any one of a plurality of zones circumferentially of the envelope and thereby create differential air pressures on opposed sides of the axis of the envelope to effect lateral movement of the nose portion and hence steering of the dirigible.

8. In combination with the envelope of a dirigible, means defining an air passage in surrounding relation to the nose portion of the envelope, having a forwardly opening inlet in advance of the nose portion and an outlet circumferentially of the envelope, means for drawing air in advance of the envelope through the inlet and into said passage so as to decrease the pressure of air in advance of the envelope sufficiently for the air pressure rearwardly of the nose portion to act upon the envelope and propel the dirigible forwardly, and means for obstructing the discharge of air from the outlet in any one of a plurality of zones circumferentially of the envelope and thereby create differential air pressures in advance of the envelope, on opposed sides of the axis of the latter to effect lateral movement of the nose portion and hence steering of the dirigible.

9. In combination with the envelope of a dirigible, means for withdrawing air from an area in advance of the nose of the envelope, means for directing the withdrawn air rearwardly around the envelope, whereby to create a reduced air pressure in advance of the envelope so that the preponderance of air pressure rearwardly of the nose will act upon the envelope and propel the dirigible forwardly, and means responsive to the movement of the withdrawn air rearwardly around the envelope, to create a partial vacuum on the exterior surface of the nose portion of the envelope and thereby aid in the forward propulsion of the dirigible.

10. In combination with the envelope of a dirigible, means for withdrawing air from an area in advance of the nose of the envelope, means for directing the withdrawn air rearwardly around the envelope, whereby to create a reduced air pressure in advance of the envelope so that the preponderance of air pressure rearwardly of the nose will act upon the envelope and propel the dirigible forwardly, and means responsive to the movement of the withdrawn air rearwardly around the envelope, to create a partial vacuum on the exterior surface of the nose portion of the envelope and thereby aid in the forward propulsion of the dirigible, the last means comprising undulations in the exterior surface of the nose portion extending longitudinally of the envelope.

11. In combination with the envelope of a dirigible, means correlated with the nose portion of the envelope to define a passage having an inlet through which air in advance of the envelope is adapted to be drawn into the passage and having an outlet through which air is adapted to discharge from the passage, means for drawing air in advance of the envelope through the inlet into said passage so as to decrease the air pressure in advance of the envelope, whereby the dirigible will be propelled forwardly, and means responsive to the movement of air through the passage to draw additional air in advance of the envelope into the passage so as to aid in decreasing the air pressure in advance of the envelope.

12. In combination with the envelope of a dirigible, means correlated with the nose portion of the envelope to define a passage having an inlet through which air in advance of the envelope is adapted to be drawn into the passage and having an outlet through which air is adapted to discharge from the passage, means for drawing air in advance of the envelope through the inlet into said passage so as to decrease the air pressure in advance of the envelope, whereby the dirigible will be propelled forwardly, and means responsive to the movement of air in said passage, to create a partial vacuum on the surface of the nose portion of the envelope so as to aid in the forward propulsion of the dirigible.

STANLY L. KELLY.